(12) United States Patent
Revenus

(10) Patent No.: US 10,695,251 B2
(45) Date of Patent: Jun. 30, 2020

(54) LIFTING COLUMN FOR A MEDICAL DEVICE

(71) Applicant: MAQUET GMBH, Rastatt (DE)

(72) Inventor: Rolf Revenus, Kuppenheim (DE)

(73) Assignee: MAQUET GMBH, Rastatt (DE)

( * ) Notice: Subject to any disclaimer, the term of this patent is extended or adjusted under 35 U.S.C. 154(b) by 700 days.

(21) Appl. No.: 15/218,858

(22) Filed: Jul. 25, 2016

(65) Prior Publication Data

US 2016/0331619 A1 Nov. 17, 2016

Related U.S. Application Data

(63) Continuation-in-part of application No. PCT/EP2015/053652, filed on Feb. 20, 2015.

(30) Foreign Application Priority Data

Feb. 21, 2014 (DE) ........................ 10 2014 102 308

(51) Int. Cl.
*A47C 31/00* (2006.01)
*A61G 13/06* (2006.01)
(Continued)

(52) U.S. Cl.
CPC ................ *A61G 13/06* (2013.01); *A47B 9/20* (2013.01); *A61G 13/10* (2013.01); *F16M 11/26* (2013.01);
(Continued)

(58) Field of Classification Search
CPC .......... A61G 13/06; A61G 13/10; A47B 9/20; A47B 2200/0054; F16M 11/26; B25B 27/062
See application file for complete search history.

(56) References Cited

U.S. PATENT DOCUMENTS

| | | | | |
|---|---|---|---|---|
| 1,403,754 A | * | 1/1922 | Erickson | B25B 27/062 |
| | | | | 29/262 |
| 2,341,677 A | * | 2/1944 | Wass | B25B 27/06 |
| | | | | 29/265 |

(Continued)

FOREIGN PATENT DOCUMENTS

| | | |
|---|---|---|
| CH | 583384 A5 | 12/1976 |
| CN | 2318397 Y | 5/1999 |

(Continued)

OTHER PUBLICATIONS

Second Chinese Office Action dated Mar. 15, 2018 for corresponding Chinese Patent Application No. 201580009389.9 (with English translation), 12 pages.

(Continued)

*Primary Examiner* — Peter M. Cuomo
*Assistant Examiner* — Morgan J McClure
(74) *Attorney, Agent, or Firm* — Aaron M. Miller

(57) ABSTRACT

An apparatus is disclosed. The apparatus includes a first operating table column member, a second operating table column member that is movable relative to the first operating table member in a longitudinal direction, and a slide member that is attached to an inner surface of the first operating table column member, the slide member having a slide surface. The slide surface is slidably mounted on an outer surface of the second operating table column member, the outer surface of the second operating table column member facing the inner surface of the first operating table column member. A curable sealing compound is disposed in a space between the slide surface of the slide member and the inner surface of the first operating table column member.

19 Claims, 3 Drawing Sheets

(51) Int. Cl.
  *A47B 9/20* (2006.01)
  *A61G 13/10* (2006.01)
  *F16M 11/26* (2006.01)
  *B25B 27/06* (2006.01)

(52) U.S. Cl.
  CPC ..... *A47B 2200/0054* (2013.01); *B25B 27/062* (2013.01)

(56) References Cited

U.S. PATENT DOCUMENTS

| | | | | |
|---|---|---|---|---|
| 2,646,619 | A * | 7/1953 | McCord | B25B 27/062 29/263 |
| 3,357,755 | A * | 12/1967 | Danly | B21D 37/10 384/49 |
| 4,225,143 | A * | 9/1980 | Hannah | F16L 51/00 277/627 |
| 4,258,960 | A * | 3/1981 | Harris | F16C 3/026 156/154 |
| 4,852,235 | A * | 8/1989 | Trease | B25B 27/023 29/263 |
| 5,317,793 | A * | 6/1994 | Boyd | B25B 27/064 29/252 |
| 5,417,614 | A * | 5/1995 | Dykema | B62D 1/192 280/777 |
| 5,560,650 | A * | 10/1996 | Woycik | B62D 1/192 280/777 |
| 5,722,300 | A * | 3/1998 | Burkhard | B62D 1/185 280/775 |
| 5,791,233 | A * | 8/1998 | Knapp | A61G 7/002 92/161 |
| 6,886,200 | B2 | 5/2005 | Blyshak et al. | |
| 8,127,639 | B2 * | 3/2012 | Manwaring | B62D 1/192 280/777 |
| 2002/0102034 | A1* | 8/2002 | Holdredge | A47C 3/20 384/34 |
| 2004/0234178 | A1* | 11/2004 | Muller | F16C 29/02 384/42 |
| 2005/0002591 | A1* | 1/2005 | Buitmann | F16M 11/28 384/35 |
| 2005/0087970 | A1* | 4/2005 | Ulintz | B62D 1/192 280/775 |
| 2006/0204152 | A1* | 9/2006 | Brinkmann | B66C 23/707 384/35 |
| 2007/0137378 | A1* | 6/2007 | Bastein | B62D 1/185 74/493 |
| 2010/0021263 | A1* | 1/2010 | Holt | F16B 5/02 411/107 |
| 2011/0304120 | A1* | 12/2011 | Pasino | B62K 25/08 280/276 |
| 2014/0177985 | A1* | 6/2014 | Saito | F16C 29/082 384/45 |
| 2015/0164715 | A1* | 6/2015 | Allred, III | A61G 1/044 5/626 |

FOREIGN PATENT DOCUMENTS

| | | |
|---|---|---|
| CN | 201334914 Y | 10/2009 |
| CN | 102361713 A | 2/2012 |
| DE | 1924400 A1 | 3/1970 |
| DE | 4344605 C1 | 2/1995 |
| DE | 19623580 A1 | 12/1997 |
| DE | 10020866 A1 | 10/2001 |
| DE | 10323102 A1 | 12/2004 |
| DE | 10323773 A1 | 12/2004 |
| DE | 102004049058 B3 | 5/2006 |
| DE | 202007014791 U1 | 12/2007 |
| EP | 1353619 A2 | 10/2003 |
| JP | 09-124277 A | 5/1997 |
| RU | 2338501 C2 | 11/2008 |
| WO | 02/058615 A2 | 8/2002 |
| WO | 03/030802 A2 | 4/2003 |

OTHER PUBLICATIONS

Translated First Office Action for CN201580009389.9, which corresponds to this application, dated Jun. 22, 2017, 44 pages (Search report found on pp. 11-12).

Russian Office Action and Russian Search Report dated Aug. 23, 2018 for corresponding Russian Patent Application No. 2016137470 (with English translations), 11 pages.

International Search Report dated Jun. 2, 2015 issued for corresponding international application No. PCT/EP2015/053652, 5 pages including English translation.

Japanese Office Action (with 4 pages of attached English Translation) dated Jan. 22, 2019 for corresponding Japanese Patent Application No. 2016-553010, 4 pages.

* cited by examiner

LIFTING COLUMN FOR A MEDICAL DEVICE

CROSS REFERENCE TO RELATED APPLICATIONS

The present application is a continuation-in-part filed under 35 U.S.C. § 111(a), and claims the benefit under 35 U.S.C. §§ 365(c) and 371 of PCT International Application No. PCT/EP2015/053652, filed Feb. 20, 2015, and which designates the United States of America, and German Patent Application No. 10 2014 102 308.0, filed Feb. 21, 2014. The disclosures of these applications are herein incorporated by reference in their entirety.

TECHNICAL FIELD

The disclosure relates to a lifting column for a medical device, with at least two column elements which may be movable relative to each other in their mutual longitudinal direction, and with at least one slide element which may be secured on an inner surface of a first of the two column elements. The slide element may have a slide surface which is mounted sliding on an outer surface of a second of the two column elements directed toward the inner surface of the first column element. The disclosure further relates to a method for the assembly of such a lifting column.

BACKGROUND

Lifting columns for medical devices can be found, for instance, in operating tables, transporters for storage areas, or supply vehicles. The demands on such lifting columns will be explained below by way of the example of a surgical table.

Before and during surgery on a patient lying on a patient positioning surface of an operating table, the patient positioning surface is typically brought into a position which allows for performing operations on the patient. In this context, it may be suitable to swivel the patient positioning surface around a horizontal axis at a comparatively large angle. The height of the patient positioning surface of the operating table should be suitably adjustable. The operating table can also be adjusted such that patient positioning surface is at relatively low elevations, which typically involves a space-saving structure of the operating table column.

Also during the operation, it may be appropriate to change the position, and particularly the height, of a patient. The components serving the change of position should therefore function reliably. Specifically, the components are guided in a sufficiently precise manner so as to make possible height adjustments without the tilting of the components. Moreover, the movable parts of the operating table tend to wear out, and should therefore be formed to be relatively stable and durable.

Typically, the components serving for height adjustments are lifting columns, in which multiple column elements slide along their mutual longitudinal axis inside each other. Since the inner surface of the column elements are not easy to access for machining purposes, they are often executed in a less precise, and in particular, in a less smooth manner They are therefore less suitable for serving as slide surfaces than the more easily machinable outer surfaces of the column elements.

From document DE 202007014791 U1, a lifting column with an inner profile and an outer profile is known, which are movable relative to each other in their mutual longitudinal direction. Between the two profiles there are slide elements, serving as separators. Each of the slide elements is mounted on one of the profiles, and slides along the respective other profile. The respective slide element consists of two parts, and is formed in the shape of a wedge. The two slide elements are movable relative to each other by an adjusting screw, and therefore have a variable total thickness. A disadvantage of these slide elements is that upon assembly, they are fixed in a laborious manner inside the respective profile. Furthermore, after a certain amount of use time, these slide elements are readjusted, which typically involves an additional laborious operation.

SUMMARY OF THE DISCLOSURE

A lifting column for an operating table which may be simple to assemble, and which may involve no readjustments of the slide elements, is provided.

In at least some exemplary embodiments, the lifting column may comprise at least two column elements which may be movable relative to each other in their mutual longitudinal direction, and at least one slide element, which may be secured on an inner surface of a first of the two column elements. The slide element may have a slide surface which is mounted for sliding on an outer surface of a second of the two column elements directed toward (e.g., facing) the inner surface of the first column element. A sealing compound may be cured (e.g., a curable sealing compound is disposed) in a space between the slide surface of the slide element and the inner surface of the first column element.

As a result of the aforementioned lifting column, the slide element may be evenly pressed by the sealing compound against the outer surface of the second column element. For example, manufacture-related unevennesses of the inner surface of the first column element may be easier to level out than leveling involving a premanufactured solid component. The sealing compound may be relatively easy to fill, and may not be mounted laboriously onto the first column element like a solid component.

The first and the second column elements may have a closed cross section. For example, the first column element may be an elongated hollow part. The second column element may be an elongated part, which for example may be hollow on the inside (e.g., similar to the first column element). As a sealing compound, for example, casting resin may be used. For example, a material that is pressure-resistant and shrinks only slightly may be used. As a result, volume loss during the curing process may be substantially prevented. The pressure resistance of the sealing compound may allow for a suitable force transmission between the inner surface of the first column element and the outer surface of the second column element. Moreover, relatively high mechanical demands on the slide elements may be substantially avoided.

In at least some exemplary embodiments, a first column element may feature at least one through hole for filling the sealing compound that is to be cured. For example, this may simplify filling the sealing compound into the space between the slide surface and the inner surface of the first column element from the outside. For example, the through hole may be a bore hole in the wall of the first column element.

In at least some exemplary embodiments, the slide element may have a carrying frame and a sliding layer with a surface which forms the slide surface. For example, the sliding layer may be in contact with the outer wall of the second column element via the slide surface, whereas the carrying frame may be in contact with the sealing compound. Due to the layered design of the slide element, both optimal sliding properties and suitable stability may be achieved. For example, the sliding layer may be made of a composite material, and the carrying frame may be made of metal.

Furthermore, in at least some exemplary embodiments, the carrying frame may have a rectangular shape, and the sliding layer may be arranged at least on a part of the surface of the carrying frame facing toward the outer surface of the second column element. Due to its rectangular shape, the slide element may easily fit into a lifting column, which may have a rectangular cross section, and may suitably stabilize the two column elements against tipping around an axis perpendicular to the mutual longitudinal axis of the column elements.

In at least some exemplary embodiments, the slide element may adhere to the inner surface of the first column element due to the cured sealing compound. As a result, no further mechanical mounting of the carrying frame onto the first column element may be involved. The slide element for example may adhere to the inner surface of the first column element in such a manner that the adhesion of the slide element to the inner surface of the first column element may preclude translational movements.

In at least some exemplary embodiments, the slide element may include at least one fixing element, which may be held by a recess in the first column element and through which the slide element may be fixated (e.g., fixed) with the first column element in a longitudinal direction. A facilitation of the insertion of the slide element when the lifting column is assembled may thereby be provided in at least some exemplary embodiments.

In at least some exemplary embodiments, there may be a seal between the slide element and the inner surface of the first column element, e.g., surrounding the space containing the sealing compound. Such an exemplary configuration may for example substantially prevent the sealing compound from flowing out of the space between the sliding surface and the inner surface of the first column element when it is being filled. Moreover, this may allow the space to be suitably filled (e.g., substantially completely filled) with sealing compound, so that suitable pressure resistance and adhesion may be achieved (e.g., maximized).

In at least some exemplary embodiments, the sealing may be elastically deformable in a direction perpendicular to the longitudinal axis of the first column element. Due to the elasticity of the seal, the slide element may be pressed against the outer surface of the second column element, thus allowing for suitable sliding capacities.

If the first and the second column elements for example each have a rectangular cross section, at least one slide element may comprise four slide elements, and one of the four slide elements may be mounted on each of the four inner surfaces of the first column element, respectively. This embodiment may allow for a relatively simple and even slide bearing between the mutually adjoining surfaces of the two column elements.

In at least some exemplary embodiments, the second column element may be guided by the at least one slide element coaxially to the longitudinal axis of the first column element. As a result, for example, no further sliding mounted guiding elements may be involved (e.g., elements that guide the longitudinal axis of the second column element coaxially to the longitudinal axis of the first column element in case of a longitudinal translation movement of the second column element). Such a configuration may, for example, facilitate manufacturing and may reduce friction.

In at least some exemplary embodiments, at least two column elements may surround an additional column element, and at least one further slide element with a sliding surface may be provided. Also, for example, the additional column element may be guided coaxially in the second column element, and may be movable relative to the second column element in the longitudinal direction of the second column element. The slide surface of the additional slide element may be mounted (e.g., sliding on an outer surface of the third column elements directed toward the inner surface of the second column element), and a further sealing compound may be cured in an additional space between the slide surface of the second slide element and the inner surface of the second column element. Such a configuration may allow for a relatively simple and stable slide bearing of lifting columns with three column elements which may be telescopically movable inside each other. Also for example, a configuration comprising four or more column element telescopically movable inside each other may be provided.

In at least some exemplary embodiments, a method for the assembly of a lifting column is provided. The method may involve at least two column elements which may be movable relative to each other in their mutual longitudinal direction, and at least one slide element which may be secured on an inner surface of a first of the two column elements and which may have a slide surface which is mounted sliding on an outer surface of a second of the two column elements directed toward the inner surface of the first column element. A sealing compound may be inserted and cured here in a space between the slide surface of the slide element and the inner surface of the first column element.

In at least some exemplary embodiments, this method may allow a simplified assembly of a lifting column without involving laboriously mounting the slide elements on the inner surface of the first column element. Furthermore, the choice of a suitable sealing compound may not involve a later adjustment of the slide elements.

In at least some exemplary embodiments, the steps described below may be performed consecutively with the mounting of the slide element onto the inner surface of the second column element.

Insertion of a leader element may be performed, onto the outside of which the slide element is spring-mounted, into the first column element until fixing elements on the slide element latch into corresponding recesses in the inner surface of the first column element and longitudinally fixate the slide element onto the first column element. Accordingly for example, upon insertion in the longitudinal direction, the leader element may be slightly moved in relation to the fixated (e.g., fixed) slide element, and may be removed from the first column element, and an elastically deformable seal connected to the slide element may press the sliding surface of the slide element onto the outer surface of the second column element.

In at least some exemplary embodiments, the insertion of the slide element may be simplified. For example, the spring effect of the leading element may keep the slide element in its position. The slide element may be pressed against the inner surface of the first column element such that the second column element, which may be coaxially inserted, initially only touches the leading element with the end pointing in the direction of the insertion (e.g., and not the slide element). In at least some exemplary embodiments, the leading element may be mounted sliding (e.g., slidably mounted) onto the slide element in the longitudinal direction of the column elements, so that upon the insertion of the second column element, the leading element may slide out of the first column element, and the spring mounting of the slide element to the leading element may be severed. After the leading element is removed, the slide element may be for example pressed by its seal onto the outer surface of the second column element, which may have been inserted.

In at least some exemplary embodiments, the space between the sliding surface of the slide element that is to be inserted and the interior surface of the first column element may be filled with sealing compound through at least a first through hole formed in the outer wall of the first column element. Also for example, the air in the space between the sliding surface of the slide element that is to be inserted and the interior surface of the first column element may escape through at least a second through hole formed in the outer wall of the first column element. For example, this may allow for an easy filling of the space with sealing compound, e.g., when a seal is present which may seal the space in an air-tight manner.

DETAILED DESCRIPTION AND INDUSTRIAL APPLICABILITY

Figure 1:
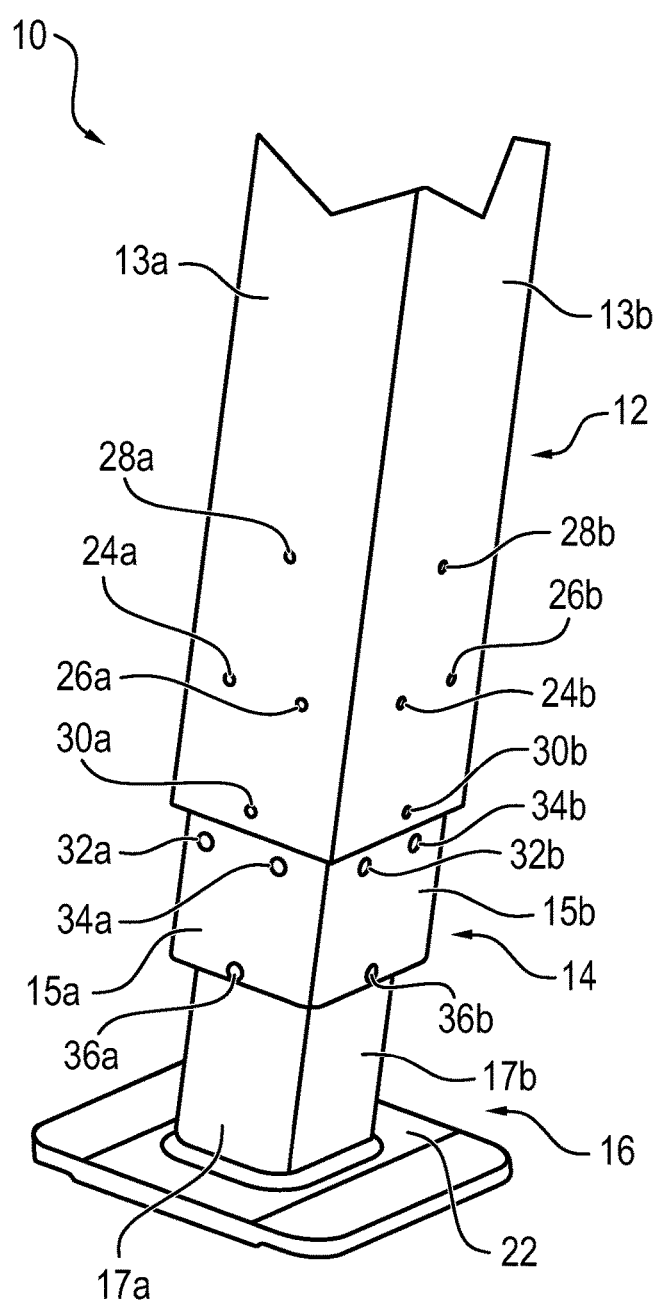
FIG. 1 shows a perspective view of a part of an exemplary lifting column of an operating table.

FIG. 1 is a perspective view of a part of the lifting column 10 for an operating table. The lifting column 10 may comprise a first operating table column member (e.g., a first column element 12), a second operating table column member (e.g., a second column element 14), and a third operating table column member (e.g., a third column element 16). The third column element 16 may be mechanically attached to (e.g., fixated onto or substantially fixed) a base plate 22, on which the lifting column 10 may be positioned. The three column elements 12, 14, 16 may have a mutual longitudinal axis, and may be movable along that axis relative to each other. As a result of such a movement of the column elements 12, 14, 16, these column elements may move into or out of each other in a telescopic manner.

Figure 3:
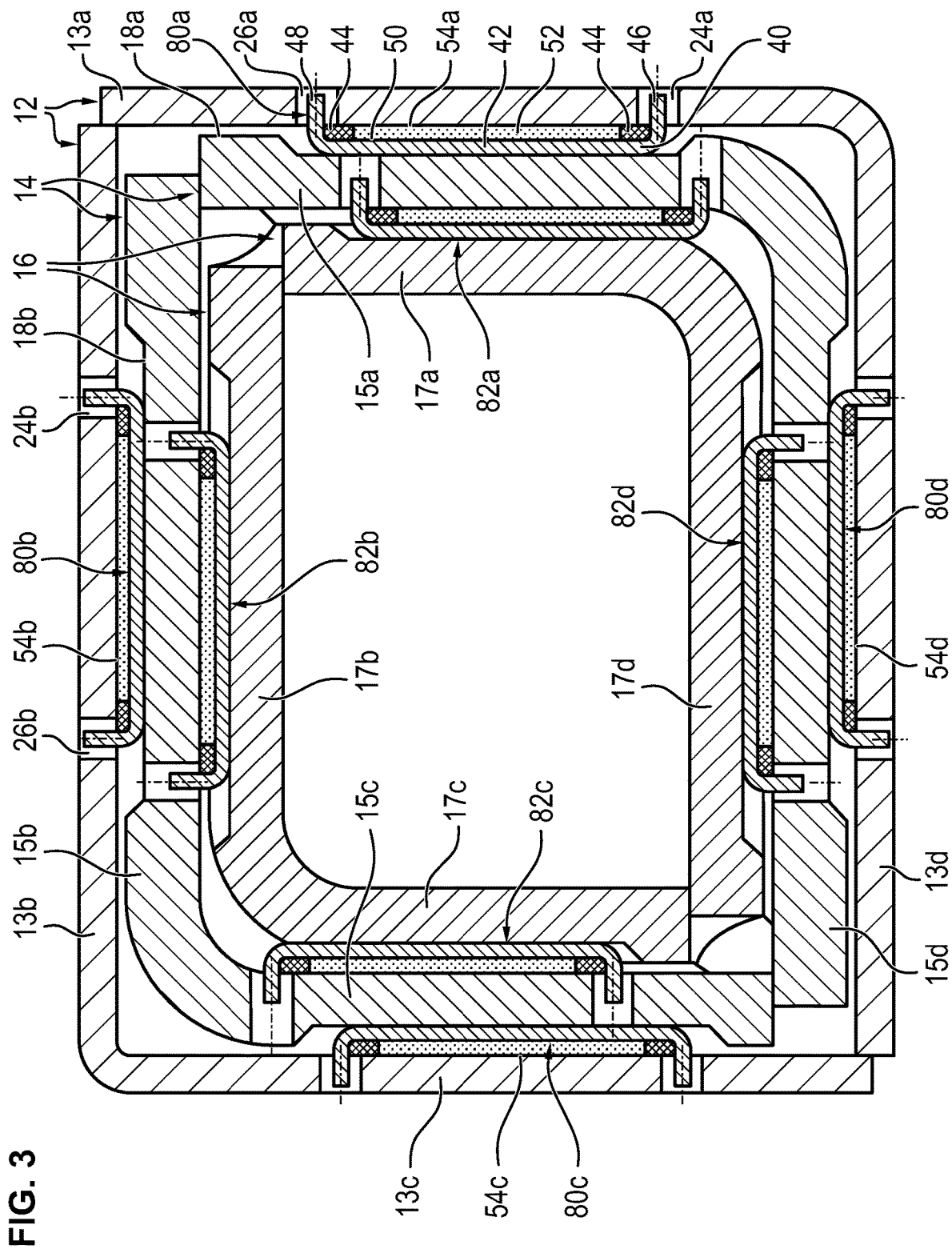
FIG. 3 shows a cross section of the exemplary lifting column according to FIG. 1.

Each of the three column elements 12, 14, 16 may have a rectangular cross section (e.g., as illustrated in FIG. 3) and may be hollow on the inside. The sides of this cross section may be formed by a first wall 13a, a second wall 13b, a third wall 13c, and a fourth wall 13d of the column element 12, and may be similar (e.g., substantially identical) in structure. Below, the wall 13a of the first column element 12 will be described as, for example, representative of the walls 13a through 13d.

The wall 13a may have a filling opening 30a for the sealing compound and a ventilation opening 28a, through which the air displaced as a result of the filling of the sealing compound can escape (e.g., is urged through ventilation opening 28a). The wall 13a may further have a first fixation opening 24a and a second fixation opening 26a, into which the fixing elements 46, 48 (e.g., fixing members) of a slide member (e.g., a slide element 40 as shown for example in FIG. 2) can latch, which may be connected to the inner surface of the first column element 12. The ventilation opening 28a, the filling opening 30a, and the fixation openings 24a, 26a, may be, for example, through holes. The references of the corresponding components on walls 13b, 13c, and 13d are complemented with the letters b, c, and, respectively.

The second column element 14 may be structured (e.g., formed) similarly to the first column element 12, and mounted sliding onto it. In the illustrated exemplary embodiment, the walls of the second column element 14 are marked with the references 15a, 15b, 15c, and 15d. Correspondingly in the illustrated exemplary embodiment, the filling openings are marked with the references 36a through 36d, the first fixation openings are marked with the references 32a through 32d, and the second fixation openings are marked with the references 34a through 34d. The third column element 16 may be mounted sliding (e.g., slidably mounted) onto the second column element 14 in substantially the same way in which the second column element 14 is mounted sliding (e.g., slidably mounted) on the first column element 12. In the illustrated exemplary embodiment, the walls of the third column element are marked with the references 17a, 17b, 17c, and 17d.

Figure 2:
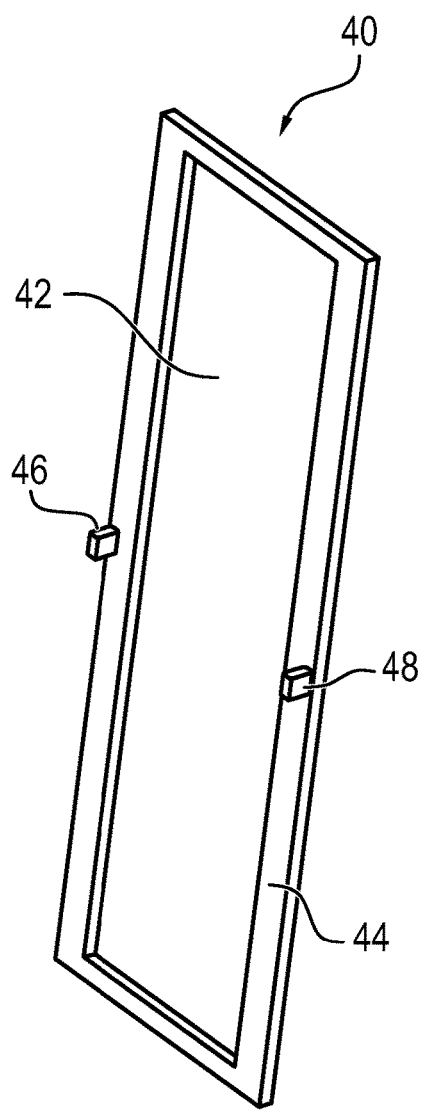
FIG. 2 shows a perspective side view of an exemplary slide element.

FIG. 2 shows a perspective side view of at least some exemplary embodiments of the slide element 40 used for the sliding mount of the column elements 12, 14, 16. The slide element 40 may have a rectangular slide body 42, the edge of which may be surrounded (e.g., partially surrounded or substantially entirely surrounded) by a seal 44. The slide element 40 may further comprise the two aforementioned fixing elements 46 and 48. The fixing elements 46 and 48 may be designed to be complementary to the fixation openings 24a and 26a, and can be held by them. The side of the slide element 40 facing away from the fixing elements 46 and 48 may include a sliding surface.

FIG. 3 shows the cross section of the exemplary lifting column according to FIG. 1. Below follows a representative description of an exemplary sliding arrangement marked as 80a, in which a first outer surface 18a of the second column element 14 may be mounted sliding (e.g., slidably mounted) via the slide element 40 to an inner surface 54a of the first column element 12. The slide element 40 may be mounted onto the relatively less machinable (e.g., manufacture-related uneven inner surface 54a). With its sliding surface 50, slide element 40 may slide along the outer surface 18a of the second column element 14. For example, in at least some exemplary embodiments, inner surface 54a may be less even (e.g., more uneven) than outer surface 18a.

The first fixing elements 46 and the second fixing elements 48 of the slide element 40 may be respectively held by the fixation openings 24a and 26a, and may fixate the slide element 40 to substantially prevent it from being affected by translational forces that are, for example, parallel to the inner surface 54a. The sliding surface 50 of the slide element 40 may be pressed against the outer surface 18a of the second column element 14 by the elastically deformable surrounding seal 44, and for example, by the sealing compound 52 arranged between the slide body 42 and the inner surface 54a.

At the time of assembly, the sealing compound 52 may be filled in fluid form through the filling opening 30a, and may be substantially prevented by the seal 44 from exiting from the space between the slide body 42 and the inner surface 54a. As a result of its fluidity, the sealing compound 52 may be in surface contact (e.g., full surface contact) with the inner surface 54a despite its unevenness. The sealing compound 52 may subsequently cure, and may exercise a substantially even pressure on the slide body 42. Moreover, the sealing compound 52 may adhere to the slide body 42 and to the inner surface 54a, such that the slide element 40 may be fixated onto the first column element 12.

In at least some exemplary embodiments, a further sliding arrangement may be arranged on each of the three other walls 13b, 13c, and 13d of the first column element 12 (e.g., respectively marked as 80a, 80b, and 80c). For example, the first column element 12 may be mounted sliding to the second column element 14 along its longitudinal axis.

In a similar manner, the second column element 14 may be mounted sliding (slidably mounted) onto the third column element 16 by way of four sliding arrangements 82a, 82b, 82c, and 82d along the longitudinal axis of the third column element 16.

In reference to the exemplary embodiment illustrated in FIG. 4, a method for the assembly of the lifting column according to the invention is described below.

Figure 4:
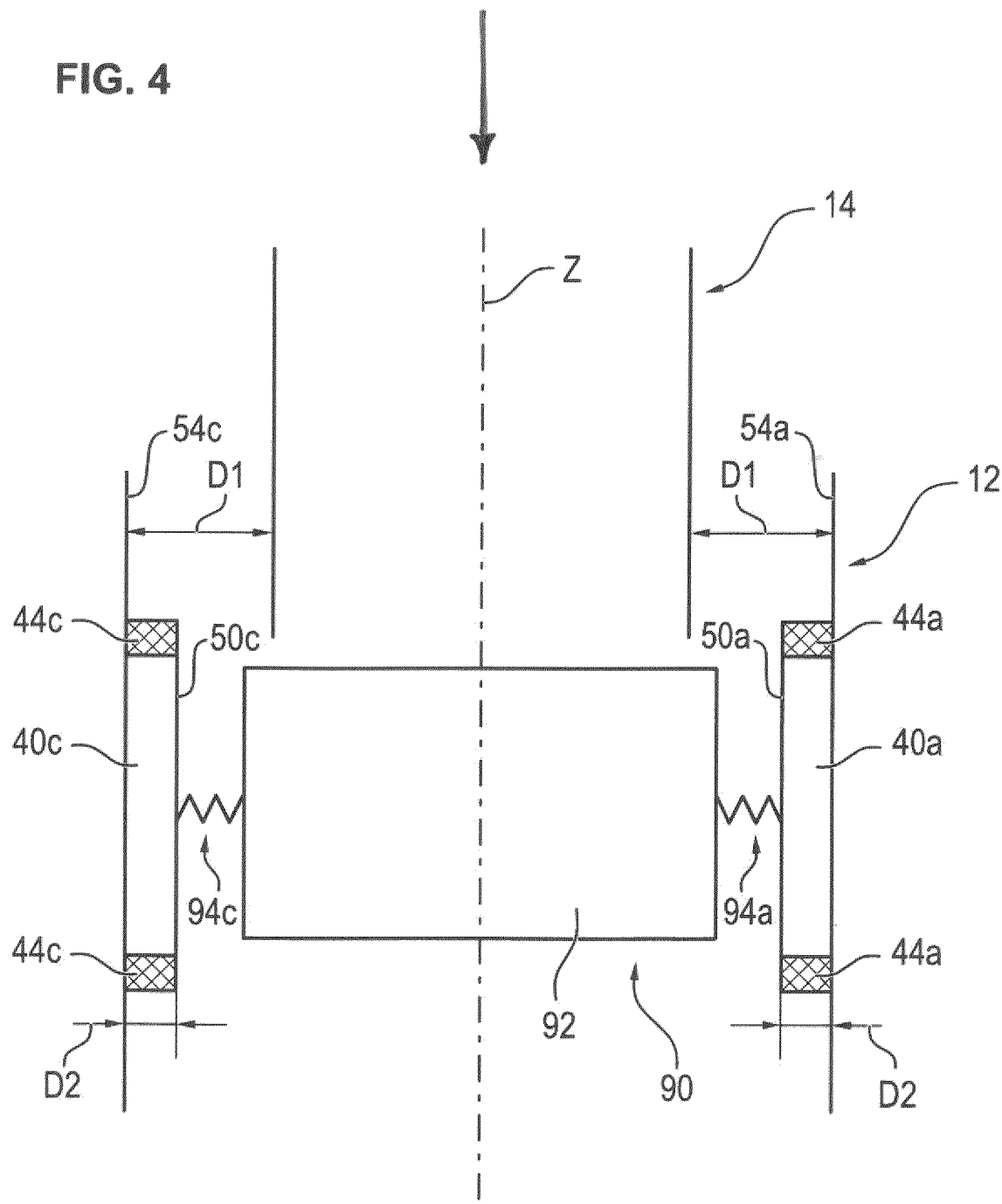
FIG. 4 shows a schematic longitudinal section of a further exemplary lifting column which has two column elements, as it is assembled.

FIG. 4 shows a schematic longitudinal section of an exemplary lifting column 100, in this example comprising (e.g., only) two column elements 12, 14. The column elements 12 and 14 may be substantially identically structured (e.g., similarly formed) and may be mounted sliding (slidably mounted) to each other by similar (e.g., substantially identical) sliding arrangements 80a through 80d (for example, as in the case of lifting column 10). In the first column element 12, an assembly including a leader member (e.g., a leading element 90) and four sliding arrangements (for example, as shown in FIG. 4, the first sliding arrangement 40a and the third sliding arrangement 40c are visible) may be inserted and latched by the fixation elements of the slide elements 40a through 40d to the respective inner surfaces 54a through 54d of the first column element 12. The leading element 90, which may be used (e.g., may only be used) for the mounting of the lifting column 100, may press the first slide element 40a and the third slide element 40c against the opposing inner surfaces 54a and 54c of the first column element 12 such that the elastically deformable seals 44a and 44c are pushed outward (to the left and to the right, respectively, as shown for example in FIG. 4). A leading body 92 of the leading element 90 may be spring-mounted by a first spring element 94a to the first slide element 40a, and by a second spring element 94b to the third slide element 40c.

The second column element 14 may then be inserted coaxially to a longitudinal axis Z into the first column element 12. The direction of insertion is marked by an arrow in the illustrated exemplary embodiment. The leading element 90 may press the slide elements 40a, 40c against the respective inner surfaces 54a, 54c of the first column element 12 such that the distance D1 between the outer surface of the respective second column element 14 and the corresponding inner surface 54a, 54c of the first column element 12 is greater than the distance D2 between the respective sliding surface 50a, 50c of the slide element 40a, 40c and the corresponding inner surface 54a, 54c of the first column element 12.

As a result of at least some of the exemplary embodiments disclosed above, when the second column element 14 is inserted, (e.g., only) the leading body 92 may be contacted by the lower end of the second column element 14 (e.g., as illustrated in FIG. 4), and moved in the direction of insertion. Consequently, the spring elements 94a and 94c together with the leading body 92 may be moved by sliding relative to the sliding surfaces 50a, 50c of the slide elements 40a, 40c, until they reach the lower end of the slide elements 40a, 40c and then lose the contact with the slide elements 40a, 40c. As a result, the leading element 90 may fall out of the bottom of the first column element 12, and the sliding surfaces 50a, 50c of the slide elements 40a, 40c may be pressed by their elastically deformed seals 44a, 44c against the respective outer surface of the second column element 14. After the execution of the aforementioned steps, the second column element 14 may be mounted sliding (e.g., slidably mounted) onto the first column element 12 via the sliding surfaces 50a, 50c of the slide elements 40a, 40c.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and the disclosed examples be considered as exemplary only, with a true scope being indicated by the following claims.

What is claimed is:

1. An apparatus, comprising: a first operating table column member; a second operating table column member that is movable relative to the first operating table column member in a longitudinal direction; and a slide member that is attached to an inner surface of the first operating table column member, the slide member having a slide surface; wherein the slide surface is slidably mounted on an outer surface of the second operating table column member, the outer surface of the second operating table column member facing the inner surface of the first operating table column member; and wherein a curable sealing compound is disposed in a space between the slide surface of the slide member and the inner surface of the first operating table column member; wherein a seal is arranged between the slide member and the inner surface of the first operating table column member, around the space holding the sealing compound; and wherein the seal is elastically deformable in a direction perpendicular to a longitudinal axis of the first operating table column member; wherein the first operating table column member has at least one through hole for filling the curable sealing compound.

2. The apparatus according to claim 1, wherein:
the slide member has a slide body and a sliding layer that form the slide surface; and
via the slide surface, the sliding layer contacts the outer surface of the second operating table column member, and the slide body contacts the curable sealing compound.

3. The apparatus according to claim 2, wherein:
the slide body is rectangular; and
the sliding layer is disposed on a surface of the slide body facing the outer surface of the second operating table column member.

4. The apparatus according to claim 1, wherein due to the curable sealing compound being hardened, the slide member adheres to the inner surface of the first operating table column member.

5. The apparatus according to claim 1, wherein the slide member has at least one fixing member, which is held in a recess in the first operating table column member, and via which the slide member is fixed in the longitudinal direction of the first operating table column member.

6. The apparatus according to claim 1:
wherein the first operating table column member has a rectangular cross-section;
wherein the second operating table member has a rectangular cross-section;

comprising a plurality of slider members, each attached to different respective inner wall surfaces of the first operating table column member; and wherein the first operating table column member, the second operating column member, and a third operating table column member share a mutual longitudinal axis, and are in a telescopic arrangement.

7. The apparatus according to claim 1:

further comprising a third column member positioned within the second operating table column member;

wherein the first operating table column member and the second operating table column member each contain both a filling opening there through for receiving sealing compound, and a ventilation opening there through for displacement of air when sealing compound is supplied to the apparatus.

8. The apparatus according to claim 1:

wherein the slide member is planar;

wherein the seal is formed as a rim around a perimeter of the slide;

wherein at least one fixing member protrudes out from the planar slide; and wherein the at least one fixing member is held in a corresponding recess in the first operating table column member, and thereby fixes the slide member in the longitudinal direction with respect to the first operating table column member.

9. An apparatus, comprising:

a first operating table column member;

a second operating table column member that is movable relative to the first operating table column member; and at least one slide member that is attached to an inner surface of the first operating table column member, the slide member having a slide surface;

wherein the slide surface is slidably mounted on an outer surface of the second operating table column member, the outer surface of the second operating table column member facing the inner surface of the first operating table column member;

wherein a curable sealing compound is disposed in a space between the slide surface of the at least one slide member and the inner surface of the first operating table column member;

wherein the inner surface of the first operating table column member is more uneven than the outer surface of the second operating table column member;

wherein a seal is arranged between the at least one slide member and the inner surface of the first operating table column member, around the space holding the sealing compound; and wherein the seal is elastically deformable in a direction perpendicular to a longitudinal axis of the first operating table column member.

10. The apparatus according to claim 9, wherein both the first operating table column member and the second operating table column member have a rectangular cross-section.

11. The apparatus according to claim 9, wherein:

the at least one slide member includes four slide elements; and one of the four slide elements is mounted on each of four inner surfaces of the first operating table column member, respectively.

12. The apparatus according to claim 9, wherein the second operating table column member is guided by the at least one slide member coaxially to a longitudinal axis of the first operating table column member.

13. The apparatus according to claim 9, wherein the first operating table column member and the second operating table column member surround a third operating table column member.

14. The apparatus according to claim 13, wherein the third operating table column member is guided coaxially in the second operating table column member, and is movable relative to the second operating table column member in a longitudinal direction of the second operating table column member.

15. The apparatus according to claim 14, wherein a slide surface of a second slide member is slidably mounted on an outer surface of the third operating table column member and faces an inner surface of the second operating table column member.

16. The apparatus according to claim 15, wherein a further sealing compound is cured in an additional space between the slide surface of the second slide member and the inner surface of the second operating table column member.

17. A method, comprising:

securing at least one slide member that has a slide surface on an inner surface of a first operating table column member, with the slide surface of the slide member being slidably mounted on an outer surface of a second operating table column member and facing the inner surface of the first operating table column member; and inserting and curing a sealing compound in a space between the slide surface of the slide member and the inner surface of the first operating table column member;

wherein the at least one slide member is secured on the inner surface of the first operating table column member by:

inserting a leader member into the first operating table column member until fixing members on the slide member latch into corresponding recesses in the inner surface of the first operating table column member and longitudinally fix the slide member onto the first operating table column member; and inserting the second operating table column member into the first operating table column member in a longitudinal direction, such that upon insertion in the longitudinal direction, the leader member is slightly moved in relation to the fixed slide member, and is removed from the first operating table column member, and an elastically deformable seal connected to the slide member presses a sliding surface of the slide member onto the outer surface of the second operating table column member.

18. The method according to claim 17, further comprising:

wherein the slide member is spring-mounted onto an outside surface of the leader member.

19. The method according to claim 18, wherein:

the space between the sliding surface of the slide member that is to be inserted and the inner surface of the first operating table column member is filled with sealing compound through at least a first through hole formed in the outer surface of the first operating table column member; and air in the space between the sliding surface of the slide member that is to be inserted and the inner surface of the first operating table column member is urged through at least a second through hole formed in the outer surface of the first operating table column member.

\* \* \* \* \*